United States Patent [19]

Jack

[11] 4,067,938

[45] Jan. 10, 1978

[54] PROCESS FOR PRODUCING MULTICELLULAR ARTICLES

[75] Inventor: James Jack, Mistley, England

[73] Assignee: Bakelite Xylonite Limited, London, England

[21] Appl. No.: 704,576

[22] Filed: July 12, 1976

Related U.S. Application Data

[62] Division of Ser. No. 459,762, March 25, 1974, abandoned.

[30] Foreign Application Priority Data

Oct. 31, 1973 United Kingdom ............... 50654/73

[51] Int. Cl.² ............................................. B29D 27/00
[52] U.S. Cl. ............................... 264/41; 260/2.5 HA; 260/27 R; 264/211; 264/288; 264/289
[58] Field of Search .......... 260/2.5 HA, 27 R, 2.5 N, 260/873, 26; 264/211, 210 R, 41

[56] References Cited

U.S. PATENT DOCUMENTS

| 3,154,461 | 10/1964 | Johnson | 264/41 |
|---|---|---|---|
| 3,313,754 | 4/1967 | Logan | 260/27 R |
| 3,367,926 | 2/1968 | Voeks | 264/211 |
| 3,463,752 | 8/1969 | Borenstein | 260/27 R |
| 3,598,776 | 8/1971 | Schivmer | 260/27 R |

FOREIGN PATENT DOCUMENTS

945,722 4/1974 Canada.

*Primary Examiner*—Jay H. Woo
*Attorney, Agent, or Firm*—Brisebois & Kruger

[57] ABSTRACT

A composition which can be formed into a shaped article and stretched to produce a multicellular stretched article comprising a blend of a thermoplastics material and a metal resinate or a resin ester.

19 Claims, No Drawings

PROCESS FOR PRODUCING MULTICELLULAR ARTICLES

This is a division of application Ser. No. 459,762, filed Mar. 25, 1974, now abandoned.

This invention relates to novel polymer compositions and especially to such compositions that can be formed into stretched articles exhibiting a multicellular structure.

Numerous proposals have been made in the literature of methods for producing stretched articles exhibiting a multicellular structure. Thus, for example, it is known to stretch articles of thermoplastics materials, uniaxially or biaxially at relatively low temperatures in such a way that during the stretching operation voids or cavities are formed in the article. Although these methods produce reasonably acceptable products, the forces required for stretching are relatively high and the rates of stretching that can be used are so low that the processes are not economically viable.

Attempts have therefore been made to discover additives which when blended with the thermoplastics material will produce a composition that can be stretched at higher temperatures, and therefore at higher rates and using lower forces, to produce an article containing voids. It has, for example, been proposed to add various fillers to the thermoplastics material or to blend the thermoplastics material with an incompatible polymer. It is believed that the voids are formed because the thermoplastics material and the additive stretch by different amounts or the additive does not stretch at all so that the thermoplastics material is drawn away from the particles of additive.

With the majority of additives that will soften on heating it has been found that satisfactory voiding can still only be achieved if the material is stretched at a temperature below that at which the unmodified polymer would be stretched in a normal commercial process for the production of stretched articles. These processes are not therefore completely economically viable since it is desirable to operate at as high a rate of stretching as possible to ensure adequate output and hence lower cost.

When non-softening additives are used, it may be possible to produce satisfactory voiding using commercially suitable conditions and rates, but such additives have other disadvantages, for example their effect of increasing the density or opacity may be undesirable, relatively high stretching forces may be needed, or the additive may interfere with a filtration step in the process.

Compositions of certain crystalline polymers, for example high density polyethylene, present problems in biaxial stretching. If a sequential process is used, the properties of the sheet from the first stretching stage may be unsuitable for carrying out the second stage. For such compositions there are special advantages in using a simultaneous biaxial stretching process for which a flat-bed stretching apparatus having spaced edge grippers may be conveniently employed. However, in such an apparatus, because of the mechanical details of its operation, unless the desired stretching can be carried out without unduly high stretching forces being required, the web will either pull out of the edge grippers or will itself tear or break so that the stretching process cannot be sustained. In these circumstances, compositions from which multicellular stretched articles may be prepared using relatively low stretching forces are of particular value.

This invention provides novel polymer compositions that can be stretched to produce multicellular articles.

These novel polymer compositions include compositions that can be simultaneously stretched biaxially on a flat bed stretching apparatus employing spaced edge grippers, to produce stretched multicellular articles at a rate equivalent to that achievable in normal commercial production of stretched articles based on the same polymer.

A novel polymer composition of the invention comprises a blend of an orientable thermoplastics material and from more than 2% to 50%, preferably 5 to 25%, by weight calculated on the blend of a metal resinate or a modified or unmodified rosin ester, which composition can be formed into a shaped article and stretched to produce a multicellular article.

The thermoplastics material may be a crystalline or non-crystalline polymer, for example an olefin polymer, for example, polyethylene or polypropylene, or an olefin copolymer; a polyester, for example, polyethylene terephthalate; a polyamide, for example nylon 11; polyvinylidene chloride; polystyrene; or polyvinyl chloride. Preferably the thermoplastics material is a crystalline polymer, especially crystalline polyethylene, especially high density polyethylene of density of at least 0.94 gm/cc or polypropylene or a crystalline copolymer based on ethylene or propylene.

Metal resinates and rosin esters have been described in the "Encyclopeadia of Chemical Technology", edited by R. E. Kirk and D. F. Othmer, Vol. 11, 799 – 810 (1953). A metal resinate used in this invention may, for example, be a calcium or zinc resinate, a mixture of metal resinates or a mixed metal resinate for example, zinc/calcium resinate.

Rosin esters that can be used in the invention include, for example, dimerised rosin esters, maleic rosin esters, and polymerised maleic rosin esters. Preferably, the metal resinate or rosin ester will have physical properties such that there is a suitable melt-compounding temperature at which both it and the thermoplastics material are molten or at least soft. The metal resinate or rosin ester should preferably have a softening point which is above the minimum temperature at which a shaped article made from the thermoplastics material is conventionally stretched. The softening point is measured by means of a ring-and-ball apparatus as described in Test E28 — 67 of the American Society for Testing Materials. Commercially available grades of metal resinates and rosin esters are specified as having "softening-ranges". Such a range indicates that a metal resinate or rosin ester will have a softening point which falls within the softening range quoted by the manufactures for its particular grade.

It is believed that the metal resinate or rosin ester should be such that a composition of this invention can be brought to the required condition for stretching in which the metal resinate or rosin ester, at least in part, comprises a separate phase distributed within the thermoplastics material such that its concentration is substantially uniform. The separate phase can exist as for example particles of spherical or disc shape, strands and lamellae, each element of which may have a dimension at right angles to the plane of stretching of for example from 2 to 5 $\mu$, although some particles may be as large as 20 $\mu$.

The presence of a separate phase can be established by any of the known methods such as haze or opacity measurements or microscopy.

The metal resinate or rosin ester will normally be selected such that the existence of the separate phase will be derived by virtue of at least partial incompatibility between it and the thermoplastics material.

The blend may be prepared by any method, or combination of methods, which is suitable for compounding thermoplastics formulations. The ingredients may, for example, be processed successively by powder mixer, banbury mixer, sheeting mill and calender to provide sheet as a shaped article. Another method involves mixing the ingredients of the blend in a compounding extruder which provides an extrudate which may be in the form of pellets which can be fed to equipment for providing shaped articles in the form of, for example, sheet, tubing, bottles, filaments, injection mouldings, etc.

The compositions may also contain supplementary additives such as fillers (both organic and inorganic) dyes or pigments, lubricants, antistatic agents, antioxidants, stabilisers, blowing agents or minor quantities of incompatible polymers. It has been found that the addition of certain fillers or pigments for example calcium carbonate, titanium dioxide and diatomaceous earth, can act to enhance the formation of voids when an article from the composition is stretched. Generally the density reduction increase is more easily achieved as the particle size of the fillers or pigments increases. Fillers or pigments having a very fine particle size of the order of 0.1 $\mu$ are less effective in enhancing the density reduction on stretching. Fillers or pigments having particle sizes greater than 10 $\mu$ are efficient but produce a coarse cell structure in the stretched articles which makes itself evident at the surface of the article which can be undesirable for certain applications, for example, if the stretched articles are to be printed. When the stretched article is intended for printing applications, the particle size range of the fillers or pigments employed is advantageously from 1 $\mu$ to 10 $\mu$, preferably 2 $\mu$ to 8 $\mu$.

In some cases where stretching a composition containing a rosin ester or metal resinate as sole void-forming additive does not result in a density reduction, the addition of a filler or pigment, will produce a composition which, when stretched, will give rise to a density reduction greater than that which would be expected from the filler alone in the thermoplastics material, showing that the filler effectively activates the property of the rosin ester or metal resinate which causes a reduction in density of the composition on stretching. Calcium carbonate fillers in particular can behave synergistically with the metal resinates and rosin esters, particularly the former. That is to say that the percentage density reduction obtained on stretching a composition containing a metal resinate plus calcium carbonate, is greater than the sum of the respective percentage density reductions obtained on stretching a blend containing the same proportion of the metal resinate and a control composition containing the same proportion of the calcium carbonate in the same thermoplastics material. Fillers and/or pigments may be added in a preferred amount of up to 30% by weight, calculated on the weight of the composition (i.e. including the filler and/or pigment).

When the metal resinate or rosin ester has associated with it free acid, which may undesirably affect the processing of the blend or products produced from the composition, for example, if an acid-sensitive material, such as an inorganic carbonate filler which may give rise to undesirable random bubble formation is present, the compositions of the invention preferably also contain a small proportion, usually 1 to 20% preferably 2 to 10%, by weight calculated on the weight of the metal resinate or rosin ester, of an acid binding agent that does not release gaseous compounds when heated with an acid and more especially one which may also act as a drying agent, for example, calcium oxide. The acid binding agent which will normally be blended with the metal resinate or rosin ester before incorporating, for example, any acid sensitive-material, will remove any free acid present in the metal resinate or rosin ester or which may be formed by degradation on heating the metal resinate or rosin ester.

Supplementary additives should not, of course, be such as to undesirably affect the production of a multicellular structure when a shaped article is stretched according to the process of the present invention.

The invention also includes shaped articles made from the polymer compositions of the invention and a method for making a multicellular stretched article by stretching such a shaped article.

The stretching process may be uniaxial or biaxial and is carried out at a temperature above the glass-transition point of the thermoplastics material and lying in the range in which the thermoplastics material can be oriented by stretching and below the softening point of the metal resinate or rosin ester.

When the thermoplastics material is a crystalline material the stretching temperature is below the crystalline melting point of the material.

The glass-transition point (or, as it is also known, the "glass-transition temperature") of the thermoplastics material used in this invention can be measured by various well-known means. For certain polyolefins that exhibit multiple transitions, the temperature selected for the purposes of definition in the present invention is that which has been described as "Tg (U)" by R. F. Boyer ("Plastics & Polymers", February 1973, p 15). For example, glass-transition points are found to be of the order of $-30°$ C and $-10°$ C for, respectively, commercially available polyethylene and polypropylene.

The crystalline melting point of a crystalline thermoplastics material is defined as that temperature above which crystalline regions cannot be recognised; for example, the temperature at which spherulites disappear when a sample of the material is heated while being examined by means of a polarising microscope. Melting points of commercially available polyolefins are found to be of the order of 110° C, 135° C, 175° C and 237° C for, respectively, branched polyethylene, linear polyethylene, polypropylene and poly 4-methylpentene-1, and of 250° C and 255° C, respectively for polyethylene terephthalate and polycaprolactam.

The temperature at which a shaped article is stretched in the process of this invention is preferably within the normal orientation temperature range for the matrix polymer provided that the softening point of the metal resinate or resin ester is high enough to allow this. By "normal orientation temperature range" there is meant that range of temperatures well known to those skilled in the art, bounded at the lower end by the minimum temperature at which uniaxial stretching of the thermoplastics material can be effected at a commercially acceptable rate and at the upper end by the maximum temperature at which stretching of the thermoplastics material can be effected to achieve a significantly oriented product.

For crystalline polymers such as polyethylene, polypropylene and some other polyolefins the upper limit of this range is in the region of, but below, the crystalline melting point of the polymer. For crystallizable polymers such as polyethylene terephthalate which is normally quenched to the substantially amorphous state before stretching the upper limit of the range is about 40° C about the glass transition temperature of the polymer and for the essentially amorphous polymers such as polystyrene and polymethylmethacrylate, the upper limit of the range is within about 50° C above the glass transition temperature of the polymer.

The following Table I gives typical commercially acceptable out-put speeds for various products and output rates of the order given or above are considered for the purpose of this invention to be commercially acceptable:

TABLE I

| Stretching made | Finished Product | Out-put speed ft/min |
|---|---|---|
| Uniaxial Stretching | Continuous | 4000 |
| Fibres | 1 to 3 thou thick Staple | 250 to 500 |
| Tape | 2 thou thick | 350 to 400 |
|  | 20 thou thick | 200 |
| Monofilaments | 5 – 30 thou thick | 200 to 400 |
| Biaxial Stretching |  |  |
| Thick film | Approx 10 thou thick | 25 to 100 |
| Thin film | ½ to 1 thou thick | 100 to 750 |

The following Table II gives the normal orientation temperature ranges which are commercially employed for some well known thermoplastics polymers to achieve the output speeds given in Table I, together with the commercial range of linear stretch ratios respectively for uniaxial and biaxial stretching of the polymers at temperatures within the normal orientation temperature range.

TABLE II

| Polymer | Uniaxial Stretch | Biaxial Stretch | Normal Orientation Temperature Ranges °C |
|---|---|---|---|
| Polypropylene | 7:1 to 12:1 | 5:1 to 10:1 | 125 – 165 |
| Polyvinylidene Chloride | 4:1 to 6:1 | 2½:1 to 4:1 | 10 – 30 |
| Polystyrene | 6:1 to 10:1 | 3:1 to 5:1 | 100 – 130 |
| Unplasticised PVC | 2½:1 to 5:1 | 2:1 to 2½:1 | 90 – 130 |
| Polyethylene terephthalate (Quenched) | 4:1 to 6:1 | 2:1 to 4:1 | 85 – 110 |
| High density Polyethylene | 4:1 to 10:1 | 4:1 to 10:1 | 100–130 |
| Nylon 66 (Quenched) | 3:1 to 6:1 | 2½:1 to 4:1 | 60 – 90 |

Certain crystallisable polymers such as nylon 6, 6 and polyethylene terephthalate can exist in varying states of crystallinity depending on the manner of preparation of the material, and the stretching conditions, especially temperature suitable for orienting such polymers by stretching, will vary according to the state of crystallinity of the material when it is stretched.

In Table I the normal orientation temperature range given applies to commercial processes in which the polymer has been cooled quite rapidly from the melt, giving a relatively low degree of crystallinity and/or small crystallite size in the material prior to stretching. If, for example, because of slower cooling from the melt, the degree of crystallinity and/or crystallite size is larger, higher temperatures than those given will be suitable for orientation.

Whether, in the process, stretching is to be carried out within or without the normal orientation temperature range for a given thermoplastics material, persons skilled in the art can readily select suitable stretch ratios and possible stretch rates for use in the process of the present invention.

Certain metal resinates or rosin esters may not be suitable as additives for use with certain polymers and even for a given additive the suitability may vary from batch to batch.

The suitability of a metal resinate or rosin ester for use in the compositions of the invention may be determined by the following test.

Test Procedure

1. Test compositions are prepared as follows:

a. 15 Parts by weight of the metal resinate or rosin ester are uniformly and finely dispersed in 85 parts by weight of the thermoplastics material by blending under fluxing conditions for the thermoplastics material b. 15 Parts by weight of the rosin ester or metal resinate and 5 parts by weight of an uncoated calcium carbonate filler of mean particle size 2.5 μ are uniformly and finely dispersed in 80 parts by weight of the thermoplastics material by blending under fluxing conditions for the thermoplastics material.

c. 5 Parts by weight of the uncoated calcium carbonate filler used in (b) are uniformly and finely dispersed in 95 parts by weight of the thermoplastics material by blending under fluxing conditions for the thermoplastics material.

2. Test specimens are then produced from compositions (a), (b) and (c) and also from (d) the thermoplastics material without additives by shaping the compositions under heat and pressure into samples free from significant flaws and free from significant molecular orientation of the thermoplastics material and having a uniform thickness. From each sample is cut a specimen suitable for uniaxial stretching on an Instron tensile testing machine or similar machine.

3. Test specimens, which have a shape such that the major part of the elongation during stretching occurs in a region initially of uniform cross-section, are then individually stretched uniaxially in the Instron tensile testing machine at various temperatures lying in the range in which the thermoplastics material can be oriented by stretching the maximum test temperature being the softening point of the metal resinate or rosin ester, at a uniform gripper separation rate of 4 to 10 inches/min, the initial gripper separation being one to two inches. The test specimen is stretched to just before break (determined by stretching one test specimen to break and stretching a second to 90% of the elongation at break of the first) and so that the gripper separation is increased by at least 100%, the specimen remaining securely gripped. The stretched test specimens are then cooled, if necessary, to room temperature and released.

4. Samples are cut from the narrowest portion of each stretched test specimen and the density of each sample is determined. The densities of each of stretched samples (a), (b), (c) and (d) are compared with the density of the relevant unstretched test specimen and the percentage density reduction is calculated.

For rosin esters and metal resinates suitable for use in compositions of the present invention without fillers the difference between the percentage density reduction achieved with a Specimen (a) and the percentage density reduction achieved with the corresponding specimen (d) is greater than or equal to 3.

For rosin esters and metal resinates suitable for use in the compositions of the invention with fillers the difference between the percentage density reduction achieved with a specimen (b) and the percentage density reduction achieved with the corresponding specimen (c) is greater than or equal to 3.

In addition to establishing those additives that are suitable for use in the invention the test also provides a guide to the temperature conditions under which multicelluar articles can be produced from a given composition by uniaxial stretching.

Stretching may be effected by any method suitable for uniaxially or biaxially stretching a thermoplastics material. Examples of such methods are: longitudinal or transverse uniaxial stretching of sheet or strip; simultaneous or sequential biaxial stretching of sheet; "bubble-blowing" of tubes; longitudinal stretching of filaments; blowing of bottles and other hollow articles; or vacuum- or pressure-forming of sheet. The degree of stretching employed in the process of the invention is dependent to some extent upon the formulation used to make the shaped article and upon the heat-history to which that article is subjected during the time which elapses between its formation and the start of its being stretched. It is, for example, sometimes advantageous to provide a "heat-seasoning" or "annealing" stage prior to the entry of the shaped article into the stretching stage of the process. The degree of stretching will also depend on the desired density reduction and the physical properties to be achieved.

It has been found that, especially for compositions based on high density polyethylene, the compositions of the invention can be stretched within the normal orientation temperature range for the thermoplastics material simultaneously, biaxially on a flat bed stretching apparatus employing spaced edge grippers at a commercially viable rate.

The unstretched shaped articles made from the compositions of this invention do not exhibit any cellular structure (unless the original composition contained a blowing agent which has been activated). When they have been stretched in the process of this invention they exhibit a multicellular structure. Such a structure is only produced when the article is stretched at a temperature which lies below the softening point of the metal resinater or rosin ester. Thus, for example, when a metal resinate having a softening point within the range of 185° C – 195° C was used in the blend, a cellular structure was obtained when sheet made by a "blown-bubble" process from an 85/15 polypropylene/resinate blend was stretched biaxially at temperatures ranging from 130° C to 165° C and when strips cut from sheet made from the same blend were stretched uniaxially at temperatures ranging from 20° C to 165° C. Supplementary additives, such as those mentioned hereinbefore or adventitious materials present, may in some cases effect a lowering of the softening point of the metal resinate or rosin ester to a temperature below that measured on the metal resinate or rosin ester itself by the apparatus and procedure of ASTM - E28 - 67. This lowering cannot be predicted with any certainty and it is preferred therefore to carry out the stretching at a temperature at least 10° C lower than the lower limit of the quoted softening range.

It will be appreciated that the temperature of the shaped article at the time of stretching need not be uniform, for example through the thickness of a sheet. Thus, the rate of heating or cooling may be such as to bring about a temperature differential through the shaped article in a direction perpendicular to the direction of stretch, just prior to stretching, causing only a portion of the shaped article to be at the specified temperature of stretching. Thus, it is within the scope of this invention to produce a stretched article having a graded structure which may comprise regions of different densities.

The cellular nature of a multicellular article provided by the process of the present invention causes it to have a density which is smaller than that of the unstretched article from which it is formed. The increase of volume of an article can be related to its change of density, assuming that the weight of any gas (most probably air) in the cells can be ignored, by:

$$\% \text{ increase of volume} = 100 \left( \frac{D_1}{D_2} - 1 \right)$$

where
$D_1$ = density of unstretched article
$D_2$ = density of stretched article The volume of the cells existing in a multicellular article can be expressed as a percentage of the overall volume of that article as $$\% \text{ cellular volume} = \left( 1 - \frac{D_2}{D_1} \right).$$

Thus, a 33⅓% reduction of density gives a 50% increase of volume; the resulting multicellular article will have 33⅓% of its volume existing as voids. Examples given later illustrate the density and volume changes which can be achieved by the process of the present invention.

The structure of multicellular stretched articles made from unfilled, unpigmented blends of this invention leads to a degree of opacity of the articles because of scattering of light by the cells. The first visually detectable degree of opacity can occur when the metal resinate or rosin ester constitutes about 2% of the weight of the blend in which it is incorporated.

The multicellular products of this invention obtained from unfilled un-pigmented blends, which products have been stretched uniaxially or biaxially may have voids having a minimum dimension of 3 μ and a maximum dimension of up to 25 μ. The presence of supplementary additives such as fillers and pigments in the blends can have the effect of increasing at least one of these dimensions. Plate-like voids having dimensions of the order, for example: diameter in plane of stretch: 17 μ and a maximum dimension at right angles thereto: 3 μ, may be achieved by employing biaxial stretching.

It is envisaged that other processes may also be conducted on the stretched articles produced from the blends of the invention. Possible treatments include the use of corona-discharge, chemical oxidation, UV-irradiation, solvents and swelling agents and the application of surface coatings and are used to improve the "receptivity" of the surface of the article to marking agents.

The multicellular products of this invention may be used for all applications where articles having a lowered density and a degree of opacity are useful. Thus, we have found that unpigmented and unfilled sheet made by the process of the invention from blends containing 15% of a metal resinate or rosin ester and based either on linear polyethylene (also known as "high density polyethylene") or on isotactic polypropylene has a paper-like "feel", and after suitable corona discharge treatment, can be printed excellently by conventional printing methods. These prints adhere well to the sheet. Such materials can thus be used as synthetic papers. Sheet made by the process of the invention may be heat-sealed to form bags or wrappers. Filaments made by the process of the invention may be used directly in the form produced or they may be subjected to further treatment to be broken down to fibriliform e.g. by severe mechanical treatment which may be coupled with subjection to solvents or heat. These fibrils may then be used in processes employed by the textile and paper industries.

It will also be appreciated that an unstretched shaped article of this invention may comprise only part of a larger stretchable structure, and may be, for example, a lamina of a multiple laminae structure prepared by, for example, a coextrusion process.

The compositions of this invention containing metal resinates or rosin esters that are degradable by exposure to normal atmospheric and actinic conditions, and are not stabilized there against may find application in the manufacture of degradable thermoplastics products.

The following Examples illustrate the invention.

EXAMPLE 1

8.5 Kg. of polypropylene (ICI Grade PXC 3391), of glass-transition point 0° C and crystalline melting point 170° C, was dry tumbled with 1.5 Kg of Ennesin ZC 21 (from Leon Frenkel Ltd.), a zinc/calcium resinate whose softening range was 185° C – 195° C (ring-and-ball) and whose metal content was 8.0%. The blend was extrusion-compounded at a temperature of 210° C to give pellets which were then re-extruded as a tube through a die held at 210° C, at a rate of 200 g/min into a water bath held at 20° C. The tube had an internal diameter of 41 mm, a wall thickness of 0.7 mm and a density of 0.93 g/ml. This figure for the density represents the average, for at least three specimens, of the results obtained by a flotation test using a range of liquids of known densities. The density figures given in the other Examples of this specification were determined by the same method. The tube was taken continuously from the water bath and stretched in a blown-bubble process at a temperature of 130° C, measured by means of a radiation pyrometer, using stretch-ratios of 6:1 in the machine and transverse directions at a rate-of-stretch (surface area) of 128,000% per minute. Tubular film was produced in layflat form at a width of 340 mm. This film was substantially opaque and had a multicellular structure in which the cells were predominantly of the closed type. After surface treatment by corona discharge, this film was found to print excellently when passed through an offset lithographic press.

Properties of this film were as follows:-
Tensile strength: machine direction: 880 kg/cm$^2$
Tensile strength: transverse direction: 710 kg/cm$^2$
% Elongation at break: machine direction: 48
% Elongation at break: transverse direction: 47
Density, g/ml: 0.62
% Density reduction (arising from stretching) 33
% Increase of volume (arising from stretching) 50

EXAMPLE 2

High-density polyethylene of density 0.95 gm/cc (B.P. Chemicals Ltd. "Rigidex 2000"), of glasstransition point — 30° C and crystalline melting point 135° C, was dry tumbled with 15% by weight of Ennesin ZC 14 (from Leon Frankel Ltd.), a zinc/calcium resinate whose softening range was 170°–180° C and metal content was 8.0%. The blend was extrusion compounded at a melt temperature of 210° C. The extrudate was pelleted, then re-extruded through a die held at 210° C as sheet on to metal rollers at 70° C. The sheet had a width of 370 mm, a thickness of one millimeter and a density of 0.96 g/ml. The sheet was reheated and then simultaneously biaxially stretched on a flat-bed stretcher at a temperature of about 120° C with a stretch-ratio of 4:1 in each direction and a rate of stretch (surface area) of 5,350% per minute. Flat, substantially opaque sheet was produced of width 1470 mm and thickness 63 microns. It has a multicellular structure in which the cells were predominantly of the closed type. After surface treatment by corona-discharge, this sheet was found to print excellently when passed through an offset lithographic press.

Properties of the sheet were as follows:-
Tensile strength: machine direction: 650 kg/cm$^2$
Tensile strength: transverse direction: 530 kg/cm$^2$
% Elongation at break: machine direction: 46
% Elongation at break: transverse direction: 57
Density, g/ml: 0.62
% Density reduction (arising from stretching) 35
% Increase of volume (arising from stretching) 55

EXAMPLE 3

A number of experiments were conducted on the lines of Example 1, but with the 15% content of Ennesin ZC 21 being replaced by various percentage contents of Ennesin ZC 14. Measurements of densities of the resultant films are given in the following Table III.

TABLE III

| Polypropylene: ZC 14 weight ratio | Density g/ml |
| --- | --- |
| 100:0 | 0.91 |
| 99:1 | 0.91 |
| 97:3 | 0.85 |
| 96:4 | 0.83 |
| 95:5 | 0.80 |
| 90:10 | 0.69 |
| 88:12 | 0.66 |
| 85:15 | 0.62 |
| 82:18 | 0.65 |
| 80:20 | 0.68 |

The table shows that under the experimental conditions the density of the films falls with increase of the percentage of the zinc/calcium resinate in the blend and then rises again with the lowest density being at a 15% content of ZC 14. A plot of these points gives a density of 0.88 g/ml at a 2% content of the metal resinate i.e. a reduction of about 3.3% below that of the material containing no metal resinate.

EXAMPLE 4

A blend (designated A) was prepared substantially as in Example 2 but having the following composition:

|  | Parts by weight |
| --- | --- |
| Rigidex 2000 | 81 |
| Ennesin ZC 21 | 15 |
| Titanium Dioxide RCR2+ | 4 |

+supplied by British Titan Products Ltd.

The blend was divided into two parts which were extruded and stretched on a flat-bed stretcher substantially as described in Example 2 under conditions listed in the Table IV below.

For purposes of additional comparison, a sample of Rigidex 2000 (designated B), to which no resinate or RCR2 had been added, was also extruded and stretched under the conditions described in Table IV.

TABLE IV

| Experiment No. | 1 | 2 | 3 |
| --- | --- | --- | --- |
| Sample Code | A1 | A2 | B |
| Die Temperatures °C | 220 | 220 | 220 |
| Roll Temperatures °C | 95 | 95 | 95 |
| Stretching Temperature °C | 138 | 128 | 128 |
| Sheet thickness (ingoing), mm | 1.5 | 1.5 | 1.5 |
| Density (ingoing), g/ml | 1.0 | 1.0 | 0.95 |
| Sheet thickness (outgoing), microns | 74 | 100 | 75 |
| Density (outgoing), g/ml | 1.0 | 0.74 | 0.95 |
| % density reduction | 0 | 26 | 0 |
| % increase of volume | 0 | 35 | 0 |

Sample A2 showed considerably greater opacity than samples A1 and B and had a multicellular structure. Multicellular structure was not observed in either B, which contained no metal resinate, or in A1 which had been stretched at a temperature above the crystalline melting point of Rigidex 2000.

After surface treating by corona discharge, the sheets were passed through an offset lithographic press and printed using an ink formulated to dry by oxidation. After 10 minutes, an inked area of each sheet was rubbed lightly with the forefinger, giving rise to the following effects:-

|  | A1 |
| --- | --- |
| Light Rubbing | Ink smeared |
| Strong Rubbing | Ink smeared |

|  | A2 | B |
| --- | --- | --- |
| Light Rubbing | Ink did not smear | Ink smeared |
| Strong Rubbing | Ink partially removed | Ink removed |

In sample A2, the ink had penetrated into micropores in the surface and this effectively increased the rate of drying of the ink.

EXAMPLE 5

Experiment A

High density polyethylene (Rigidex 2000) was dry tumbled with 15% by weight of Ennesin ZC 14. The blend was extrusion compounded at a die temperature of 210° C. The extrudate was pelleted, then re-extruded as a tube into a water bath held at 20° C. The rate of extrusion was 200 g/min. The tube had an internal diameter of 40 mm, a wall thickness of 0.7 mm and a density of 0.96 g/ml. The tube was taken continuously from the water bath and stretched in a blown-bubble process at a temperature of 115° C, using stretch-ratios of 5:1 in the machine and transverse directions at a rate of stretch (surface area) of 89,000% min. Tubular film of 200 mm diameter was produced. Properties of the film were as follows:-

Tensile strength: machine direction: 710 kg/cm$^2$
Tensile strength: transverse direction: 780 kg/cm$^2$
% Elongation at break: machine direction: 51
% Elongation at break: transverse direction: 44
Density, g/ml: 0.61
% Density reduction (arising from stretching) 36
% Increase of volume (arising from stretching) 57

Experiment B

As a comparison, a "blown-bubble" process was run on the lines of Experiment A, but with the difference that Rigidex 2000 was used on its own, i.e. without additions of metal resinate or other materials. Tube extrusion was as in Experiment A and the same apparatus for bubble-blowing was used. The temperature at which this blowing was conducted was 118° C. It was found impossible to maintain an unbroken bubble when applying stretch-ratios of 5:1 in the machine and transverse directions. However, the bubble could be maintained when applying a stretch-ratio of 5:1 in the machine direction and a stretch-ratio of from 3:1 to 4:1 in the transverse direction. Typical values of tensile strength of film made from Rigidex 2000 using these unbalanced stretch-ratios were:

Tensile strength: machine direction: 1050 kg/cm$^2$
Tensile strength: transverse direction: 630 kg/cm$^2$ Similar running difficulties were experienced when other commercially available high-density polyethylenes replaced the Rigidex 2000.

Experiments A and B illustrate the greater ease of obtaining "balanced" stretched film when a blend of high-density polyethylene and calcium/zinc resinate replaces high-density polyethylene in a blown-bubble process.

EXAMPLE 6

8.5 Kg of polypropylene (ICI Grade PXC 3391) having a glass transition temperature of 0° C and crystalline melting point 170° C, was dry tumbled with 1.5 Kg of a rosin ester selected from the following three materials:

| | Rosin Ester | Supplier | Description | Softening Range °C | S.G. |
| --- | --- | --- | --- | --- | --- |
| A | Ennesin D157 | Leon Frenkel Ltd. | Dimerized rosin ester | 155 – 160 | 1.09 |
| B | Ennesin GM 120 | " | Maleic Rosin ester | 150 – 155 | 1.12 |
| C | Ennesin PP90 | " | Maleic polymerised rosin ester | 165 – 170 | 1.10 |

Each blend was extrusion compounded at a melt temperature of 210° C. the extrudate was pelleted, then re-extruded through a die held at 210° C at a rate of 200 g/min into a water bath held at 20° C. The tube had an internal diameter of 41 mm and a wall thickness of 0.7 mm. The tube was taken continuously from the water bath and stretched in a blown-bubble process at a temperature at 135° C measured by means of a radiation pyrometer, using stretch-ratios of 6:1 in each of the machine and transverse directions and a rate-of-stretch (surface area) of 128,000% per minute. Tubular film was produced in layflat form at a width of 340 mm. Each of the films obtained employing, respectively, rosin esters A, B and C was substantially opaque and had a multicellular structure in which the cells were predominantly of the closed cell type. After surface treatment by corona discharge, the films were found to print well when passed through an offset lithographic printing press.

Properties of the unblown tubes and of the stretched films produced therefrom were as follows:

TABLE V

| Property | Rosin Ester | | |
|---|---|---|---|
| | A | B | C |
| Density by floatation g/ml unblown tube | 0.93 | 0.93 | 0.93 |
| Density by floatation g/ml stretched film | 0.73 | 0.78 | 0.61 |
| % Density reduction (arising from stretching) | 22 | 16 | 34 |
| % Increase in volume (arising from stretching) | 27 | 19 | 52 |
| Stretched Film | | | |
| Tensile strength: machine direction (Kg/Cm²) | 920 | 950 | 880 |
| Tensile strength: transverse direction (Kg/Cm²) | 850 | 860 | 840 |
| % Elongation at break: machine direction | 60 | 50 | 60 |
| % Elongation at break: transverse direction | 55 | 47 | 56 |

EXAMPLE 7

| | I | II | III |
|---|---|---|---|
| | Parts by Weight | | |
| PVC - matrix mixture as given below | 100 | 85 | 80 |
| Ennesin ZC 21 | — | 15 | 15 |
| Calcium Carbonate (Calopake F supplied by J & E Sturge Ltd) (Average particle size 2.5 μ) | — | — | 5 |

PVC maxtrix mixture as employed above comprised the following:

| | Parts by Weight |
|---|---|
| Scon 5300 - a PVC suspension polymer (supplied by Vinatex Ltd.) | 100 |
| Mellite 26 - a dibutyl-tin alkyl maleate containing antioxidant (supplied by Albright & Wilson Mfg Co. Ltd.) | 2 |
| Wax GL 3 - a divalent metal salt of long chain fatty acids (supplied by Farbwerke Hoechst A.G.) | 0.3 |

The above formulations I, II and III were each blended and gelled on a two roll mill employing roll temperatures of 150° C and 160° C and the resulting materials sheeted off. Pieces of each material were then cut and pressed at 170° C to provide plaques of approximate thickness 0.060 - 0.080 inch. Samples of each 2 inches long and of uniform cross section were then cut and stretched uniaxially on an Instron tensile testing machine employing an initial gripper separation of 1 inch and a rate of gripper separation of 5 inches/minute at various temperatures and stretch ratios. The following Table VI gives the results obtained.

TABLE VI

| Stretching Temperature (° C) | Stretch Ratio | | | Density reduction (%) | | |
|---|---|---|---|---|---|---|
| | Composition | | | Composition | | |
| | I | II | III | I | II | III |
| 90 | 2:1 | 2:1 | 2:1 | <1 | 7 | 6 |
| | | 3½:1 | | | 13 | |
| | 4:1 | 4:1 | 4:1 | <1 | 17 | 26 |

TABLE VI-continued

| Stretching Temperature (° C) | Stretch Ratio | | | Density reduction (%) | | |
|---|---|---|---|---|---|---|
| | Composition | | | Composition | | |
| | I | II | III | I | II | III |
| 95 | | 3½:1 | | | 17 | |
| | 2:1 | 2:1 | 2:1 | <1 | 7 | 5 |
| 100 | 3:1 | | 2¾:1 | <1 | | 6 |
| 110 | 2:1 | 2:1 | 2:1 | 0 | 2 | 4 |

The above Table shows that the metal resinate induces some density reduction in the materials tested at a low stretch ratio and that the presence of filler under such conditions does little to enhance that effect. At higher stretch ratios, however, the efficiency of the metal resinate is greatly increased and the presence of filler clearly enhances the effect of the metal resinate on the density reduction.

EXAMPLE 8

Polystyrene granules, grade ST 30 UL supplied by Sterling Moulding Materials Ltd. were tumble mixed with ingredients according to the following formulations:

| | A | B | C | D |
|---|---|---|---|---|
| | Parts by Weight | | | |
| Polystyrene ST 30 UL | 100 | 85 | 80 | 95 |
| Ennesin ZC 21 | — | 15 | 15 | — |
| Calcium Carbonate (Calopake F) | — | — | 5 | 5 |

Each mixture was then treated as follows: The mixture was fed to a 1⅛ inches twin screw extruder fitted with a 1 inch × 1/32 inch tape die maintained at 200° C and an extruded tape produced which was air cooled by passage through an air cooling ring. The cooled extrudate was then diced, dried and re-extruded under the same conditions to produce a tape, which in hauling off from the die was drawn down as little as possible. 2 inch long specimens of each of the tapes produced from mixtures A, B, C and D were cut and uniaxially stretched along the machine direction at various temperatures at stretch ratios on the Instron tensile testing machine under the gripping conditions of Example 7. The density reductions on stretching were measured and tabulated in Table VII.

TABLE VII

| Stretching Temperature (° C) | Stretch Ratio | | | | Density Reduction % | | | |
|---|---|---|---|---|---|---|---|---|
| | Composition | | | | Composition | | | |
| | A | B | C | D | A | B | C | D |
| 110 | 5:1 | 6:1 | 6:1 | 6:1 | 2 | 7 | 12 | 11 |
| | 4:1 | 4:1 | 4:1 | 4:1 | 0 | 0 | 6 | 1 |
| 120 | 6:1 | 6:1 | 6:1 | 6:1 | 2 | 2 | 7 | 1 |
| 130 | 4:1 | 4:1 | 4:1 | 4:1 | 0 | 0 | 8 | 2 |

These results show the effect of the temperature of stretching on the function of the metal resinate in the polystyrene employed, the presence of the filler being necessary to activate the density reducing function of the metal resinate at the higher temperature.

EXAMPLE 9

Sheet extruder feed-stocks were prepared respectively from the following formulations: (all parts being by weight)

| Component | Formulation | | | | | | | | |
|---|---|---|---|---|---|---|---|---|---|
| "a" | 1 | 2 | 3 | 4 | 45 | 6 | 7 | 8 | 9 |
| Rigidex 2000 | 70 | 85 | 80 | 74 | 76.6 | 65 | 65 | 81.5 | 81.5 |

-continued

|   |   | Formulation |   |   |   |   |   |   |   |
|---|---|---|---|---|---|---|---|---|---|
| "b" | Ennesin ZC 21 | — | 15 | 8 | 8 | 9.6 | 10 | 10 | 13.5 | 13.5 |
| "c" | Ca Co₃ (Calopake F) (Average particle size 2.5 μ) | 30 | — | 8 | 12 | 9.2 | 20 | — | 5 | — |
|   | Ti O₂ Rutile (Particle size 1 to 5μ) | — | — | 4 | 6 | 4.6 | 5 | 5 | — | 5 |
|   | Diatomaceous earth (Celite PF1 supplied by Johns Manville Corpn.) (Particle size 5 to 15 μ) | — | — | — | — | — | — | 20 | | |

The sheet extruder feed-stocks were each prepared in the following manner:

i. A Master Batch "A" was prepared containing equal proportions of components "a" and "b". To assist the preparation of the Master batch "A" and its extrusion, "b" (the Ennesin ZC 21) was crushed such that it passed through a ¼ inch mesh sieve. The crushed "b" component, was then tumblemixed with an equal weight of "a" and the mix fed to a twin screw extruder and extruded, employing a melt temperature of approximately 205° C. The extrudate comprising a flat strip was air cooled and diced. This product was Master Batch "A"

ii. A Master Batch "B" was prepared containing equal proportions of components "a" and "c". When components "c" includes more than one sub-component, the sub-components will be present in component "c" in the proportions specified in the above table. Components "a" and "c" in equal proportions were tumble mixed and the mixture fed to a Banbury-type mixer heated to 160° C and the mixer operated for seven minutes such as to achieve thorough mixing and a material temperature of 200° C. The Banbury-mixed material was then discharged on to a mill-maintained at approximately 155° C and from which it was removed continuously in the form of a strip which was cooled by passage through a water bath, dried by festooning in air and diced.

iii. Master Batch "A" and/or Master Batch "B" as applied to the above formulations were tumble mixed with a further amount of component "a" to give the required total fomulation as specified in the above table and the required sheet extruder feed stock.

The sheet extruder feed-stocks, comprising respectively formulations 1 to 9 above were further dried and then fed to a sheet extruder fitted with a sheet die held at a temperature of 210° C and extruded as a sheet on to metal rollers at 95° C. The sheet had a width of 370 mm and a thickness of 1 mm. The sheet fed at a rate of 7.5 feet/min was reheated and then simultaneously biaxially stretched on a flat-bed stretcher, of the type described in our co-pending British application 35302/70, at a stretching temperature as indicated respectively in the following table, and employing a machine stretch-ratio of 4:1 in each direction to achieve a linear output rate of 30 feet/min. The stretched sheet produced from each feedstock was cooled while being held at its edges to prevent substantial shrinkage, edge-trimmed and reeled. Samples of each material were taken before stretching and after stretching and density determinations made, the results of which are given in the following table:

|   | Formulation |   |   |   |   |   |   |   |   |
|---|---|---|---|---|---|---|---|---|---|
|   | 1 | 2 | 3 | 4 | 5 | 6 | 7 | 8 | 9 |
| Approximate Stretching Temperature ° C | 125 | 120 | 120 | 120 | 120 | 120 | 120 | 120 | 120 |
| Density Reduction % on Stretching | 0 | 23 | 5 | 15 | 20 | 50 | 30 | 35 | 20 |

Stretching of the sheet produced from formulation 1 was difficult and could not be achieved below 125° C. The product exhibited no density reduction and had the appearance of ordinary chalk-filled sheet. Each of the stretched products obtained from formulation 2 to 9 were flat and exhibited enhanced whiteness increasing with the degree of density reduction, arising from the multicellular structure produced on stretching, which multicellular structure was comprised predominantly of cells of the closed type. After surface treatment by Corona discharge, the sheets were found to print well when passed through an off-set lithographic press.

This Example illustrates the difficulty of obtaining a multicellular structure employing filler alone and the efficiency of an additive incorporated according to the present invention in obtaining a density reduction on stretching. The effect of incorporating various fillers and pigments is also illustrated and it can be seen that the addition of calcium carbonate to a metal resinate containing formulation will allow a reduction in the amount of metal resinate required to achieve a given density reduction. It can also be seen especially from the result obtained by stretching the sheet from formulation 6, that the addition of calcium carbonate and metal resinate gives rise to a synergistic effect. It was found that, when one part of quick lime was included with component "b" in formulation number 6 above and component "a" correspondingly reduced to 64 parts, the Master Batch "A" produced was substantially bubble-free and when used, gave a formulation likewise substantially bubble-free and sheet substantially free of surface blemishes. The properties of the stretched sheet obtained from the modified formulation were found to be substantially the same as for formulation 6.

EXAMPLE 10

Example 6 was repeated substantially as described except that the rosin ester was replaced in turn by
  a. Ennesin PC 175 (supplied by Leon Frenkel) and described as dimerised calcium resinate of softening range 175° C to 180° C b. A zinc resinate, supplied by Leon Frenkel, having a softening range of 140° C to 150° C The densities of the unblown and stretched tubes were determined for each of the additives and the density reductions calculated respectively were:
a. 39%
b. 18%

Both of the stretched products were substantially opaque and had a multicellular structure in which the cells were predominantly of the closed cell type.

EXAMPLE 11

Example 1 was repeated using the following formulation:

|  | Parts by weight |
|---|---|
| Polypropylene (ICI grade PXC 3391) | 65 |
| Polyethylene (Rigidex 2000) | 17.5 |
| Polystyrene (ST 30 UL Sterling Moulding Materials Ltd.) | 2.5 |
| Ennesin ZC 14 | 15 |

The stretched tubular film produced had a density of only 0.5 gm/cc which was approximately 45% lower than that of the extruded quenched tube prior to blowing.

EXAMPLE 12

High-density polyethylene (BP, Chemicals Ltd. "Rigidex 2000") of glass transition point −30° C and crystalline melting point 135° C, was dry-tumbled with 15% by weight of Ennesin D157 specified in Example 6. The blend was extrusion compounded at a melt temperature of 210° C. The extrudate was pelleted, then reextruded through a die held at 210° C as sheet on to metal rollers at 70° C. The sheet had a width of 370 mm, a thickness of 1 mm. The sheet was reheated and then simultaneously biaxially stretched on a flat-bed stretcher at a temperature of about 120° C with a machine stretch-ratio of 4:1 in each direction and a rate of stretch (surface area) of 5,350% per minute. Flat, substantially opaque sheet was produced of width 1470 mm and thickness approximately 63 microns. The sheet produced had a multicellular structure in which the cells were predominantly of the closed type. After surface treatment by Corona discharge, this sheet was found to print well when passed through an off-set lithographic printing machine. Properties of the unstretched sheet and of the stretched sheet were as follows:

Density (by floatation) unstretched sheet g/ml: 0.96
Density stretched sheet g/ml: 0.62
% Density reduction (arising from stretching): 35
% Increase of volume (arising from stretching): 55

Stretched Sheet

Tensile strength: machine direction: 620
Tensile strength: transverse direction: 510
% Elongation at break: machine direction: 49
% Elongation at break: transverse direction: 60

EXAMPLE 13

Additives A to C as specified in Example 6 were each in turn blended with Rigidex 2000 in the proportions 15:85. Blending was effected by first tumbling the matrix resin and additive together and then by passage through a 2¼ inches twin screw extruder fitted with a 2 inch × ⅜ inch tape die, the extruder temperatures being:

Feed end: 120° C
Metering section: 200° C
Filter region: 220° C
Die: 215° C

The extrudates were air cooled, dried and then reextruded in turn through the same extruder under the same conditions as above to produce extruded tapes of each blend. 2 inch long specimens were cut from the cooled tapes and stretched uniaxially in the MD at various temperatures and stretch ratios using the Instron tensile testing machine in the manner described in Example 7. Density measurements on the unstretched and stretched tapes were made and the effect of stretching on the density of each tape derived and tabulated as follows:

|  | Stretching Temperature ° C | Additive A | Additive B | Additive C |
|---|---|---|---|---|
| % Density reduction on stretching | 100 | 17 | 8 | 19 |
|  | 120 | 13 | 3 | 10 |
|  | 130 | 3 | 3 | 6 |
| Stretch ratio | 100 | 8.75:1 | 8.50:1 | 4.00:1 |
|  | 120 | 9.50:1 | 10.75:1 | 5.75:1 |
|  | 130 | 9.50:1 | 8.50:1 | 8.25:1 |

It is claimed:

1. A process for the production of a multicellular stretched article, which comprises forming a blend of an orientable thermoplastics material and at least one additive, the additive comprising from more than 2 to about 50% by weight, calculated on the weight of the blend, forming a shaped article from the blend and stretching the article uniaxially or biaxially to produce a multicellular stretched article, wherein the additive is selected from metal resinates and modified or unmodified rosin esters which are at least partially incompatible with the thermoplastics material at least so that they form separate phases at the temperature at which the article is to be stretched, the thermoplastics material, when the additive is a metal resinate, being other than a crystalline polyolefin, the blend is formed by blending the thermoplastics material with the additive at a temperature at which both the additive and the thermoplastics material are molten or at least soft, and stretching is effected at a temperature within the normal orientation temperature range for the thermoplastics material, which temperature is below the softening point of the additive.

2. A process as claimed in claim 1, wherein the thermoplastics material is an olefin polymer or copolymer, a polyester, a polyamide, polystyrene, polyvinyl chloride or polyvinylidene chloride.

3. A process as claimed in claim 1, wherein the thermoplastics material is a crystalline polymer.

4. A process as claimed in claim 1, wherein the thermoplastics material is a crystalline polyolefin.

5. A process as claimed in claim 4, wherein the thermoplastics material is selected from crystalline polyethylene, crystalline polypropylene, crystalline ethylene copolymers and crystalline propylene copolymers.

6. A process as claimed in claim 1, whenever the thermoplastics material is a high density polyethylene having a density of at least 0.94 gm/cc.

7. A process as claimed in claim 1, wherein the additive is a metal resinate and is selected from calcium and zinc resinates, mixtures of calcium and zinc resinates and mixed calcium-zinc resinates.

8. A process as in claim 1, wherein the additive is a rosin ester and is selected from dimerised rosin esters, maleic rosin esters and maleic polymerised rosin esters.

9. A process as claimed in claim 1, wherein the additive at least in part comprises a separate phase uniformly distributed within the thermoplastics material.

10. A process as claimed in claim 1, wherein the blend also contains at least one additional additive selected from fillers and pigments.

11. A process as claimed in claim 1, wherein the additional additive is selected from calcium carbonate titanium dioxide and diatomaceous earth.

12. A process as claimed in claim 11, wherein the additional additives have a particle size of from 1 to 10 $\mu$.

13. a process as claimed in claim 11, wherein the additional additive is present in an amount of up to 30% by weight calculated on total weight of the composition.

14. A process as claimed in claim 1, which also contains an acid binding proportion of an acid binding additive.

15. A process as claimed in claim 13, wherein the acid binding additive is calcium oxide.

16. A process as claimed in claim 14, wherein the acid binding additive is present in an amount of from 1 to 20% by weight calculated on the metal resinate or rosin ester.

17. A process as claimed in claim 11, wherein the blend is a blend of a thermoplastics material, from more than 2 to 50% by weight of an additive selected from metal resinates and rosin esters, and at least one additional additive selected from fillers and pigments, which additional additive will act synergistically with the additive to enhance void formation in the stretched shaped article made from the composition.

18. A process as claimed in claim 1, wherein the article is a fiber, filament, tape, sheet, film or a tube.

19. A process as claimed in claim 1, wherein stretching is carried out on a flat bed stretching apparatus for simultaneous biaxial stretching.

* * * * *

UNITED STATES PATENT AND TRADEMARK OFFICE
CERTIFICATE OF CORRECTION

PATENT NO. : 4,067,938
DATED : January 10, 1978
INVENTOR(S) : James Jack

It is certified that error appears in the above-identified patent and that said Letters Patent are hereby corrected as shown below:

[62] Division of Ser. No. 454,762, March 25, 1974, abandoned.

*Signed and Sealed this*

*Twelfth* Day of *December 1978*

[SEAL]

Attest:

RUTH C. MASON
*Attesting Officer*

DONALD W. BANNER
*Commissioner of Patents and Trademarks*